(12) United States Patent
Sugiura et al.

(10) Patent No.: US 11,056,939 B2
(45) Date of Patent: Jul. 6, 2021

(54) ROTOR WITH STRESS RELAXATION MAGNETIC FLUX SUPPRESSION HOLES WITH FLUX PATHS WIDTH LESS THAN LENGTH OF THE HOLE

(71) Applicants: AISIN AW CO., LTD., Anjo (JP); TOYOTA JIDOSHA KABUSHIKI KAISHA, Toyota (JP)

(72) Inventors: Yukiyasu Sugiura, Gamagori (JP); Masayuki Ikemoto, Anjo (JP); Naoto Saito, Nishio (JP); Suguru Gangi, Toyota (JP); Shinya Sano, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 16/457,004

(22) Filed: Jun. 28, 2019

(65) Prior Publication Data
US 2020/0014262 A1 Jan. 9, 2020

(30) Foreign Application Priority Data

Jul. 5, 2018 (JP) .............................. JP2018-128538
May 17, 2019 (JP) .............................. JP2019-093436

(51) Int. Cl.
  *H02K 1/27* (2006.01)
  *H02K 21/14* (2006.01)
(52) U.S. Cl.
  CPC ........... *H02K 1/2766* (2013.01); *H02K 21/14* (2013.01)

(58) Field of Classification Search
  CPC ...... H02K 1/27; H02K 1/2706; H02K 1/2713; H02K 1/272; H02K 1/2726; H02K 1/2733;
  (Continued)

(56) References Cited

U.S. PATENT DOCUMENTS 2,680,822 A * 6/1954 Brainard ................ H02K 1/276
  310/216.123
7,420,306 B2 * 9/2008 Park ....................... H02K 29/03
  310/156.57

(Continued)

FOREIGN PATENT DOCUMENTS

JP  2018-042381 A  3/2018
WO  2017/208317 A1  12/2017

OTHER PUBLICATIONS

JP2018042381A English Translation.*

*Primary Examiner* — Maged M Almawri
(74) *Attorney, Agent, or Firm* — Oliff PLC (57) ABSTRACT

A rotor that includes a permanent magnet; and a rotor core that has a magnet placement hole in which the permanent magnet is disposed, wherein the stress relaxation magnetic flux suppression hole is formed such that a total width of a minimum width of a first magnetic flux passage between a portion of the stress relaxation magnetic flux suppression hole on a first side in the longitudinal direction and the magnet placement hole and a minimum width of a second magnetic flux passage between a portion of the stress relaxation magnetic flux suppression hole on a second side in the longitudinal direction and the magnet placement hole is less than a total length of a length of the first magnetic flux passage in the longitudinal direction and a length of the second magnetic flux passage in the longitudinal direction.

10 Claims, 4 Drawing Sheets

(58) Field of Classification Search
CPC .... H02K 1/274; H02K 1/2746; H02K 1/2753;
H02K 1/276; H02K 1/2766; H02K
1/2773; H02K 1/278; H02K 1/2786;
H02K 1/32; H02K 21/12; H02K 21/10;
H02K 21/22; H02K 2213/03
USPC ............ 310/156.01, 156.43, 156.53, 156.56,
310/156.57, 156.72, 156.74, 156.83
See application file for complete search history.

(56) References Cited

U.S. PATENT DOCUMENTS

| | | | | |
|---|---|---|---|---|
| 8,044,546 B2* | 10/2011 | Liang | ................... | B60L 7/14 |
| | | | | 310/156.07 |
| 8,664,820 B2* | 3/2014 | Cho | ................... | F04B 35/04 |
| | | | | 310/156.45 |
| 8,937,418 B2* | 1/2015 | Morishita | ............ | H02K 1/2766 |
| | | | | 310/156.36 |
| 9,054,568 B2 | 6/2015 | Kori | ................... | F04D 13/06 |
| 9,484,790 B2* | 11/2016 | Takahashi | ................ | H02K 9/22 |
| 9,559,572 B2* | 1/2017 | Fang | ..................... | H02K 15/03 |
| 9,800,106 B2* | 10/2017 | Kondou | ................ | H02K 1/02 |
| 9,847,682 B2* | 12/2017 | Takahashi | ................ | H02K 9/19 |
| 9,923,436 B2* | 3/2018 | Takahashi | .............. | H02K 15/03 |
| 9,935,509 B2* | 4/2018 | Yamaguchi | .......... | H02K 1/2766 |
| 10,020,699 B2* | 7/2018 | Ishikawa | ............... | H02K 1/2766 |
| 10,153,671 B2* | 12/2018 | Totaro | ................... | H02K 1/276 |
| 10,211,690 B2* | 2/2019 | Laldin | ................. | H02K 1/2766 |
| 10,256,684 B2* | 4/2019 | Hasegawa | .............. | H02K 1/146 |
| 10,270,324 B2* | 4/2019 | Sidiropoulos | ........ | H02K 21/028 |
| 10,355,537 B2* | 7/2019 | Zhu | ........................ | H02K 15/03 |
| 10,476,359 B2* | 11/2019 | Nishifukumoto | ...... | H02K 15/03 |
| 10,658,892 B2* | 5/2020 | Katayama | ................ | H02K 1/27 |
| 10,658,895 B2* | 5/2020 | Higashino | ............ | H02K 1/2766 |
| 10,727,707 B2* | 7/2020 | Ballweg | ................... | H02K 1/28 |
| 10,749,391 B2* | 8/2020 | Degner | ............... | H02K 1/2766 |
| 2005/0200223 A1* | 9/2005 | Tajima | ................... | B60L 50/51 |
| | | | | 310/156.46 |
| 2007/0063607 A1* | 3/2007 | Hattori | ................ | H02K 1/2766 |
| | | | | 310/156.53 |
| 2007/0126304 A1* | 6/2007 | Ito | ........................ | H02K 1/2766 |
| | | | | 310/156.53 |
| 2007/0252467 A1* | 11/2007 | Hoemann | .............. | H02K 1/276 |
| | | | | 310/156.53 |
| 2010/0026128 A1* | 2/2010 | Ionel | ...................... | H02K 1/276 |
| | | | | 310/156.53 |
| 2010/0119390 A1* | 5/2010 | Baba | ...................... | H02K 1/276 |
| | | | | 417/423.7 |
| 2012/0070322 A1* | 3/2012 | Oho | ........................ | F04B 35/04 |
| | | | | 417/410.1 |
| 2012/0086291 A1* | 4/2012 | DeBlock | .................. | H02K 1/32 |
| | | | | 310/61 |
| 2012/0242182 A1* | 9/2012 | Yabe | ...................... | H02K 1/276 |
| | | | | 310/156.53 |
| 2013/0221784 A1* | 8/2013 | Kori | ......................... | H02K 1/27 |
| | | | | 310/90 |
| 2014/0077653 A1* | 3/2014 | Takahashi | ............ | H02K 1/2766 |
| | | | | 310/156.53 |
| 2014/0217849 A1* | 8/2014 | Soma | ..................... | H02K 1/276 |
| | | | | 310/156.53 |
| 2015/0026966 A1* | 1/2015 | Fang | ..................... | H02K 1/276 |
| | | | | 29/598 |
| 2015/0108867 A1* | 4/2015 | Nakagawa | .......... | F04D 25/0606 |
| | | | | 310/156.47 |
| 2015/0137632 A1* | 5/2015 | Takahashi | ............ | H02K 1/2766 |
| | | | | 310/54 |
| 2015/0326080 A1* | 11/2015 | Wakita | ................. | H02K 1/2773 |
| | | | | 310/156.38 |
| 2016/0141926 A1* | 5/2016 | Kano | ..................... | H02K 1/276 |
| | | | | 310/156.53 |
| 2016/0261158 A1* | 9/2016 | Horii | ..................... | H02K 1/274 |
| 2016/0301269 A1* | 10/2016 | Yamaguchi | .......... | H02K 1/2766 |
| 2016/0301271 A1* | 10/2016 | Saito | ........................ | B60L 50/61 |
| 2017/0012481 A1* | 1/2017 | Ballweg | ................ | H02K 15/028 |
| 2017/0063185 A1* | 3/2017 | Kondou | ................... | H02K 1/02 |
| 2017/0126080 A1* | 5/2017 | Hasegawa | ................ | H02K 3/18 |
| 2017/0294814 A1* | 10/2017 | Baba | ....................... | H02K 7/14 |
| 2018/0048196 A1* | 2/2018 | Kuo | ....................... | H02K 1/2766 |
| 2018/0205274 A1* | 7/2018 | Heo | ........................ | H02K 1/24 |
| 2018/0219438 A1* | 8/2018 | Oikawa | ................ | H02K 1/2753 |
| 2018/0233973 A1* | 8/2018 | Hazeyama | ............. | H02K 1/27 |
| 2019/0081523 A1* | 3/2019 | Yabe | ...................... | H02K 1/276 |
| 2019/0089215 A1* | 3/2019 | Ishikawa | ................. | H02K 1/26 |
| 2019/0190331 A1* | 6/2019 | Hasegawa | ............. | H02K 1/146 |
| 2019/0363619 A1* | 11/2019 | Zhu | ...................... | H02K 1/2706 |
| 2020/0021177 A1* | 1/2020 | Shizu | .................... | H02K 1/223 |
| 2020/0106315 A1* | 4/2020 | Yoneda | ................. | H02K 1/2706 |
| 2020/0127511 A1* | 4/2020 | Matsubara | .......... | H02K 1/2766 |
| 2020/0127515 A1* | 4/2020 | Soma | ..................... | H02K 1/32 |
| 2020/0153301 A1* | 5/2020 | Kamata | ................ | H02K 1/32 |
| 2020/0185991 A1* | 6/2020 | Soma | ..................... | H02K 1/32 |
| 2020/0195070 A1* | 6/2020 | Tan | ....................... | H02K 1/276 |
| 2020/0228038 A1* | 7/2020 | Takahashi | ................ | H02K 3/12 |

* cited by examiner

COMPARATIVE EXAMPLE

FIG. 7

COMPARATIVE EXAMPLE

ROTOR WITH STRESS RELAXATION MAGNETIC FLUX SUPPRESSION HOLES WITH FLUX PATHS WIDTH LESS THAN LENGTH OF THE HOLE

INCORPORATION BY REFERENCE

The disclosures of Japanese Patent Application No. 2018-128538 filed on Jul. 5, 2018 and Japanese Patent Application No. 2019-093436 filed on May 17, 2019, including the specification, drawings and abstract are incorporated herein by reference in their entireties.

BACKGROUND

The present disclosure relates to a rotor and a rotary electric machine.

There have hitherto been known a rotor and a rotary electric machine that include permanent magnets (see Japanese Patent Application Publication No. 2018-42381 (JP 2018-42381 A), for example).

JP 2018-42381 A discloses a rotor that includes magnets disposed in magnet holes provided in a rotor core. In the rotor, the rotor core is provided with a plurality of slits. The slits are configured to be deformable such that the facing inside surfaces of the slits are brought into proximity to or contact with each other by a stress generated by the difference in thermal expansion between the rotor core and the magnets. Specifically, a resin material is disposed in clearances between the magnet holes and the magnets in the rotor, and both the rotor core and the magnets are heated in order to thermally cure the resin material during manufacture of the rotor. At this time, the rotor core is thermally expanded, while the magnets are thermally contracted. In the rotor, when the rotor core and the magnets are cooled after the resin material is thermally cured, the rotor core is thermally contracted while the magnets are thermally expanded, and the magnets press the magnet holes of the rotor core from the inside to the outside of the magnet holes, which generates a stress in the rotor core. The slits are configured to be deformed such that the inside surfaces of the slits are brought into proximity to or contact with each other in order to absorb the stress. In the rotor, magnetic flux generated from the magnets passes over the slits with the inside surfaces thereof in proximity to or contact with each other.

SUMMARY

In a state (which is referred to as a "no-load state or low-load state" later in this paragraph) in which no power or relatively small power is supplied to a coil of a stator, the rotor which is provided with the magnets is occasionally rotated by a different device (such as an engine, for example). In this case, since no power or relatively small power is supplied to the coil of the stator, magnetic flux generated by the rotor is not substantially decreased by a magnetic field generated by the coil of the stator. However, the rotor according to JP 2018-42381 A is configured such that magnetic flux generated from the magnets passes over the slits. Therefore, it is considered that, in the no-load state or low-load state, magnetic flux generated from the magnets of the rotor passes over the slits without being decreased, which makes magnetic flux excessive. In this case, the iron loss is increased in the rotor or the stator because of excessive magnetic flux, which lowers the energy efficiency with which the rotor is rotated by the different device. Thus, there have been desired a rotor and a rotary electric machine that can suppress magnetic flux from magnets (permanent magnets) from becoming excessive in a no-load state or low-load state while relaxing a stress due to expansion of the magnets.

An exemplary aspect of the disclosure provides a rotor and a rotary electric machine that can suppress magnetic flux from permanent magnets from becoming excessive, even in a state in which no power or relatively small power is supplied to a coil of a stator, while relaxing a stress due to expansion of the permanent magnets.

A first aspect of the present disclosure provides a rotor including: a permanent magnet; and a rotor core that has a magnet placement hole in which the permanent magnet is disposed, in which: the rotor core is provided with a stress relaxation magnetic flux suppression hole provided on one side of the magnet placement hole in a short-length direction with respect to the magnet placement hole as seen in an axial direction and formed so as to overlap the permanent magnet in a longitudinal direction of the magnet placement hole as seen in the short-length direction, the stress relaxation magnetic flux suppression hole relaxing a stress generated by expansion of the permanent magnet and suppressing magnetic flux generated by the permanent magnet; and the stress relaxation magnetic flux suppression hole is formed such that a total width of a minimum width of a first magnetic flux passage between a portion of the stress relaxation magnetic flux suppression hole on a first side in the longitudinal direction and the magnet placement hole and a minimum width of a second magnetic flux passage between a portion of the stress relaxation magnetic flux suppression hole on a second side in the longitudinal direction and the magnet placement hole is less than a total length of a length of the first magnetic flux passage in the longitudinal direction and a length of the second magnetic flux passage in the longitudinal direction.

In the rotor according to the first aspect of the present disclosure, as described above, the stress relaxation magnetic flux suppression hole, which is provided on a first side of the magnet placement hole in the short-length direction, relaxes a stress generated by expansion of the permanent magnet, and suppresses magnetic flux generated by the permanent magnet, is formed such that the total width of the minimum width of the first magnetic flux passage and the minimum width of the second magnetic flux passage is less than the total length of the length of the first magnetic flux passage in the longitudinal direction and the length of the second magnetic flux passage in the longitudinal direction. Consequently, a stress generated by expansion of the permanent magnet can be relaxed, even in the case where the permanent magnet is expanded with respect to the rotor core, during manufacture of the rotor. The widths of the first magnetic flux passage and the second magnetic flux passage, through which magnetic flux that enters or exits from a surface of the permanent magnet corresponding to the total length, can be restricted by the stress relaxation magnetic flux suppression hole while relaxing a stress generated by expansion of the permanent magnet with the stress relaxation magnetic flux suppression hole. Magnetic saturation is caused in the first magnetic flux passage and the second magnetic flux passage, the widths of which are restricted as described above, in the case where much magnetic flux passes therethrough. Thus, the amount of magnetic flux that passes through the first magnetic flux passage and the second magnetic flux passage can be restricted, which suppress magnetic flux that passes therethrough from becoming excessive. As a result, it is possible to suppress magnetic flux from the permanent magnet from becoming excessive, even in a state in which no power or relatively small power is supplied to the coil of the stator, while relaxing a stress generated by expansion of the permanent magnet. In the case where power is supplied to the coil of the stator (at the time with a high load), the amount of magnetic flux generated by the permanent magnet is decreased (the magnet operation point is lowered) by a magnetic field generated by the coil of the stator. Thus, magnetic saturation is unlikely to be caused in the first magnetic flux passage and the second magnetic flux passage even in the case where the widths of the first magnetic flux passage and the second magnetic flux passage are restricted by the stress relaxation magnetic flux suppression hole. Thus, it is possible to suppress the performance of the rotor from being degraded. As a result, it is possible to suppress the performance of the rotor from being degraded in the case where power is supplied to the coil of the stator (at the time with a high load), and suppress magnetic flux from the permanent magnet from becoming excessive in the case where no power or relatively small power is supplied to the coil of the stator (at the time with no load or a low load), while relaxing a stress generated by expansion of the permanent magnet.

A second aspect of the present disclosure provides a rotary electric machine including: a stator; and a rotor disposed so as to face the stator in a radial direction, in which: the rotor has a permanent magnet and a rotor core that has a magnet placement hole in which the permanent magnet is disposed; the rotor core is provided with a stress relaxation magnetic flux suppression hole provided on a first of the magnet placement hole in a short-length direction with respect to the magnet placement hole as seen in an axial direction and formed so as to overlap the permanent magnet in a longitudinal direction of the magnet placement hole as seen in the short-length direction, the stress relaxation magnetic flux suppression hole relaxing a stress generated by expansion of the permanent magnet and suppressing magnetic flux generated by the permanent magnet; and the stress relaxation magnetic flux suppression hole is formed such that a total width of a minimum width of a first magnetic flux passage between a portion of the stress relaxation magnetic flux suppression hole on a first side in the longitudinal direction and the magnet placement hole and a minimum width of a second magnetic flux passage between a portion of the stress relaxation magnetic flux suppression hole on a second side in the longitudinal direction and the magnet placement hole is less than a total length of a length of the first magnetic flux passage in the longitudinal direction and a length of the second magnetic flux passage in the longitudinal direction.

With the rotary electric machine according to the second aspect of the present disclosure, in which the stress relaxation magnetic flux suppression hole is configured as described above, it is possible to provide a rotary electric machine that can suppress magnetic flux from the permanent magnet from becoming excessive, even in a state in which no power or relatively small power is supplied to the coil of the stator, while relaxing a stress due to expansion of the permanent magnet. Consequently, by suppressing magnetic flux from the permanent magnet from becoming excessive, it is possible to suppress an increase in the iron loss in the rotor or the stator due to magnetic flux becoming excessive, and to suppress a reduction in the energy efficiency with which the rotor is rotated.

According to the present disclosure, it is possible to suppress magnetic flux from the permanent magnet from becoming excessive, even in a state in which no power or relatively small power is supplied to the coil of the stator, while relaxing a stress due to expansion of the permanent magnet.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described below with reference to the drawings.

[Structure of Rotor Core]

The structure of a rotor 1 (rotary electric machine 100) according to the present embodiment will be described with reference to FIGS. 1 to 5.

Herein, the term "axial direction" means a direction along a rotational axis C1 of the rotor 1, and means the Z direction in the drawings. The term "radial direction" means the radial direction (the direction of an arrow R1 or the direction of an arrow R2) of the rotor 1. The term "circumferential direction" means the circumferential direction (the direction of an arrow E1 or the direction of an arrow E2) of the rotor 1.

Figure 1:
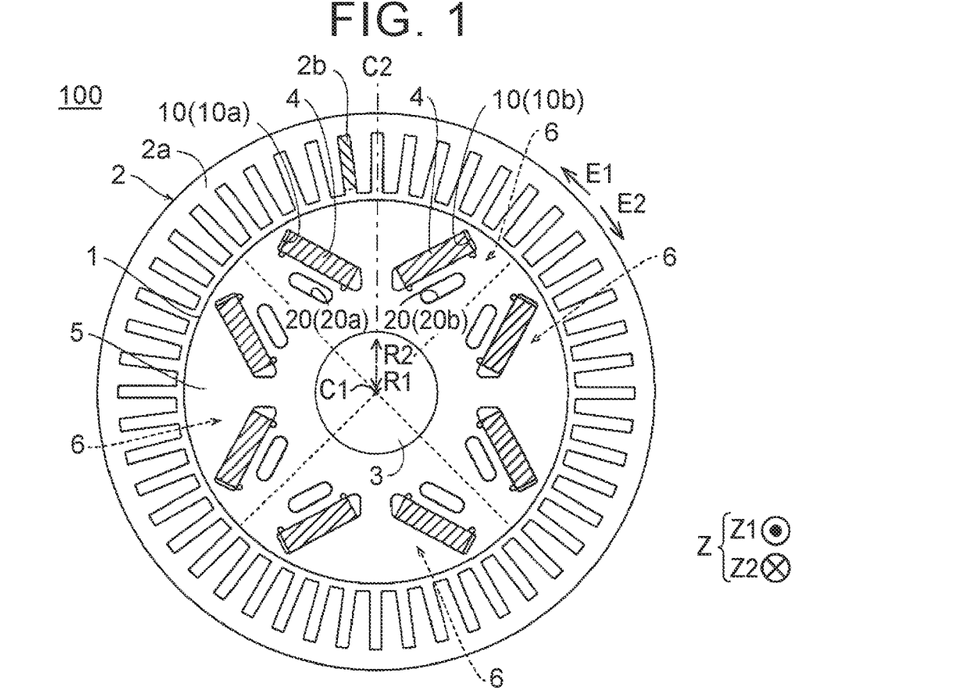
FIG. 1 is a cross-sectional view illustrating the configuration of a rotor (rotary electric machine) according to an embodiment of the present disclosure as seen in the axial direction.

As illustrated in FIG. 1, the rotary electric machine 100 includes the rotor 1 and a stator 2. The rotor 1 and the stator 2 are each formed in an annular shape. The rotor 1 is disposed on the radially inner side of the stator 2 so as to face the stator 2. That is, in the present embodiment, the rotary electric machine 100 is constituted as a rotary electric machine of an inner rotor type. A shaft 3 is disposed on the radially inner side of the rotor 1. The shaft 3 is connected to an engine etc. via a rotational force transfer member such as a gear. For example, the rotary electric machine 100 is constituted as a motor, a generator, or a motor generator, and configured to be mounted on a vehicle.

The rotor 1 includes a plurality of permanent magnets 4, and a rotor core 5 that has a plurality of magnet placement holes 10 in which the permanent magnets 4 are disposed. That is, the rotary electric machine 100 is constituted as an interior permanent magnet (IPM) motor. The stator 2 includes a stator core 2a and a coil 2b disposed in the stator core 2a. The stator core 2a includes a plurality of electromagnetic steel sheets (silicon steel sheets) stacked in the axial direction, for example, and is configured to enable passage of magnetic flux (see FIG. 4). The coil 2b is connected to an external power source portion, and configured to be supplied with power (e.g. three-phase AC power). The coil 2b is configured to generate a magnetic field when supplied with power. The rotor 1 and the shaft 3 are configured to rotate with respect to the stator 2 along with drive of the engine etc. also in the case where no power is supplied to the coil 2b. In FIG. 1, only a part of the coil 2b is illustrated. However, the coil 2b is disposed over the entire circumference of the stator core 2a.

(Configuration of Permanent Magnets)

Figure 2:
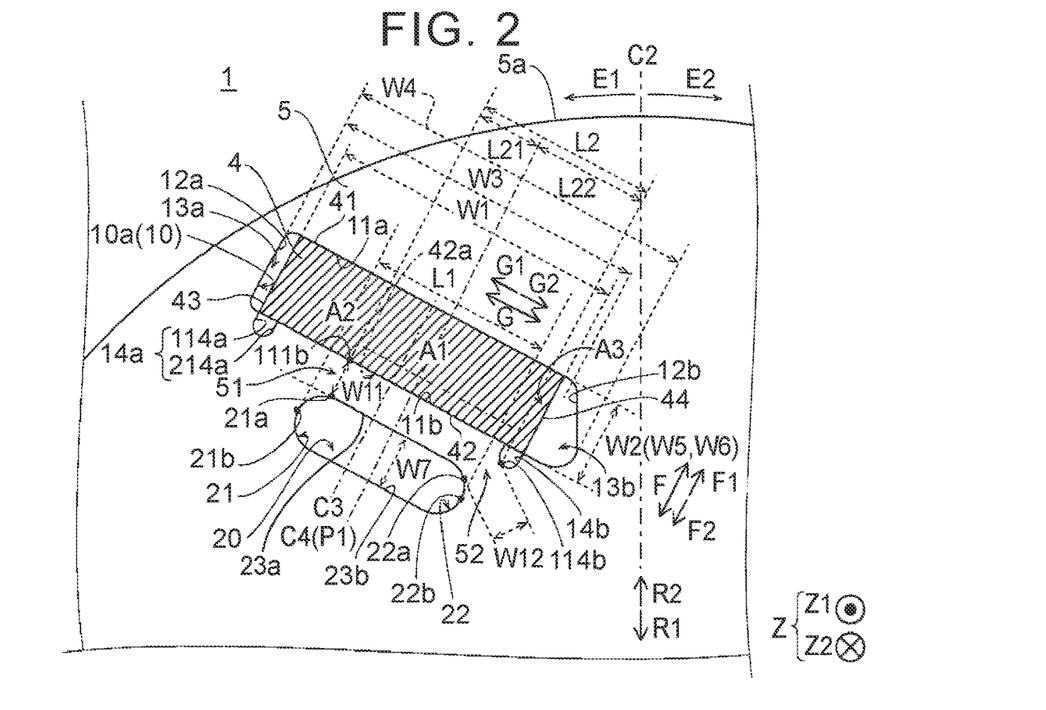
FIG. 2 is an enlarged cross-sectional view of the rotor according to the embodiment of the present disclosure.

As illustrated in FIG. 2, the permanent magnet 4 has a substantially rectangular shape (e.g. a rectangular shape) as seen in the axial direction, for example. That is, the permanent magnet 4 has a rectangular parallelepiped shape with side surfaces extending along the axial direction. The short-length direction and the longitudinal direction of the permanent magnet 4 as viewed in the axial direction are defined as an F direction and a G direction, respectively. For example, the permanent magnet 4 is configured such that the magnetization direction corresponds to the short-length direction.

Of the end surfaces of the permanent magnet 4 along the longitudinal direction, an end surface on the side in the direction of an arrow F1 is defined as a first end surface 41, and an end surface on the side in the direction of an arrow F2 is defined as a second end surface 42. Of the end surfaces of the permanent magnet 4 along the short-length direction, meanwhile, an end surface on the side in the direction of an arrow G1 is defined as a third end surface 43, and an end surface on the side in the direction of an arrow G2 is defined as a fourth end surface 44. The width of the permanent magnet 4 in the longitudinal direction (first end surface 41 and second end surface 42) is defined as W1. The width of the permanent magnet 4 in the short-length direction (third end surface 43 and fourth end surface 44) is defined as W2. That is, W1 is greater than W2.

A coefficient of thermal expansion K1 of the permanent magnets 4 is different from a coefficient of thermal expansion K2 of the rotor core 5. For example, the rotor core 5 is expanded by being heated, while the permanent magnets 4 are contracted in the short-length direction by being heated (the width W2 becomes smaller). Meanwhile, the rotor core 5 is contracted by being cooled, while the permanent magnets 4 are expanded in the short-length direction by being cooled (the width W2 becomes larger). Consequently, when the permanent magnets 4 and the rotor core 5 are cooled during manufacture of the rotor 1, the rotor core 5 is pressed by the permanent magnets 4 because of expansion of the permanent magnets 4, which generates a stress in the rotor core 5.

As illustrated in FIG. 1, the permanent magnets 4 are disposed (fixed) in the respective magnet placement holes 10 of the rotor core 5. The rotor 1 is provided with a plurality of magnetic poles 6 implemented by the plurality of permanent magnets 4. For example, two permanent magnets 4 are provided for each of the magnetic poles 6.

(Configuration of Rotor Core)

The rotor core 5 is formed in an annular shape as seen in the axial direction. For example, the rotor core 5 is formed by stacking a plurality of electromagnetic steel sheets (silicon steel sheets) in the axial direction. The rotor core 5 is configured to enable passage of magnetic flux (see FIG. 4). The rotor core 5 is fixed to the shaft 3, and configured to be rotatable together with the shaft 3 with respect to the stator 2. The rotor core 5 is provided with a plurality of magnet placement holes 10 (the number of which is the same as the number of the permanent magnets 4) and a plurality of stress relaxation magnetic flux suppression holes 20 (hereinafter referred to "holes 20") (the number of which is the same as the number of the permanent magnets 4).

(Configuration of Magnet Placement Holes)

In the present embodiment, as illustrated in FIG. 1, a pair of magnet placement holes 10 are provided for each of the magnetic poles 6 so as to have a V-shape (inverted V-shape) in which the magnet placement holes 10 are farther away from each other on the radially outer side as seen in the axial direction. That is, a magnet placement hole 10a, which is one (on the side in the direction of the arrow E1) of the pair of magnet placement holes 10, is formed such that the short-length direction (F direction) of the permanent magnet 4 which is disposed inside the magnet placement hole 10a intersects a circumferential center line C2 (d-axis) of the magnetic pole 6. Meanwhile, a magnet placement hole 10b, which is the other (on the side in the direction of the arrow E2) thereof, is formed at a position symmetrical to the magnet placement hole 10a with respect to the circumferential center line C2. The magnet placement holes 10a and 10b are each formed so as to have a substantially rectangular shape. The configuration of the magnet placement hole 10b will not be described below since the magnet placement hole 10b is formed so as to be symmetrical to the magnet placement hole 10a with respect to the circumferential center line C2.

As illustrated in FIG. 2, inside surfaces 11a and 11b of the magnet placement hole 10a on the sides in the short-length direction abut against the permanent magnet 4 directly or via an adhesive etc. The inside surface 11a is an inside surface of the magnet placement hole 10a on the side in the direction of the arrow F1. The inside surface 11b is an inside surface of the magnet placement hole 10a on the side in the direction of the arrow F2. Meanwhile, inside surfaces 12a and 12b of the magnet placement hole 10a on the sides in the longitudinal direction are disposed away from the permanent magnet 4 via a void or an adhesive (resin material) etc. The inside surface 12a is an inside surface on the side in the direction of the arrow G1. The inside surface 12b is an inside surface on the side in the direction of the arrow G2. That is, a width W3 of the inside surface 11a and a width W4 of the inside surface 11b are larger than the width W1 of the permanent magnet 4, while a width W5 of the inside surface 12a and a width W6 of the inside surface 12b are substantially the same as the width W2 of the permanent magnet 4. A magnetic flux suppression portion 13a is provided at a portion of the magnet placement hole 10a on the side in the direction of the arrow G1. A magnetic flux suppression portion 13b is provided at a portion of the magnet placement hole 10a on the side in the direction of the arrow G2. The magnetic flux suppression portions 13a and 13b have a function of suppressing leakage magnetic flux (short-circuit magnetic flux).

In the present embodiment, the magnet placement hole 10a is provided with stress relaxation grooves 14a and 14b that relax a stress generated by expansion of the permanent magnet 4, the stress relaxation grooves 14a and 14b being provided on the side of the hole 20 and formed so as to be dented toward one side (in the direction of the arrow F2) in the short-length direction from portions of the inside surface 11b that are adjacent, in the short-length direction, to the third end surface 43 and the fourth end surface 44 of the permanent magnet 4 on the sides in the longitudinal direction. The stress relaxation groove 14a is provided at a portion of the magnet placement hole 10a on the side in the direction of the arrow G1. The stress relaxation groove 14b is provided at a portion of the magnet placement hole 10a on the side in the direction of the arrow G2.

Figure 3:
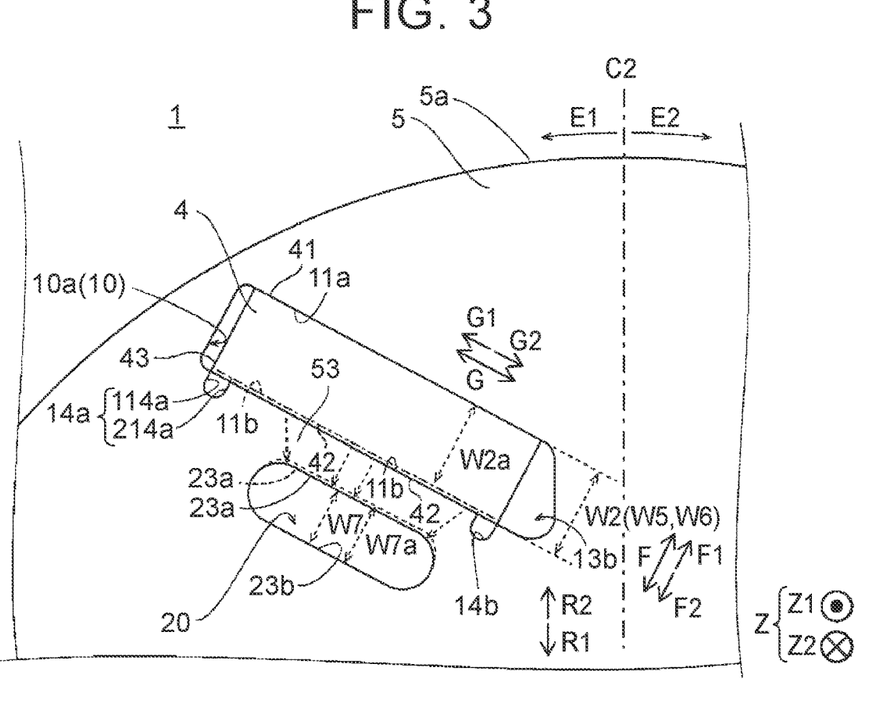
FIG. 3 illustrates the configuration of a stress relaxation groove and a stress relaxation magnetic flux suppression hole according to the embodiment of the present disclosure.

As illustrated in FIG. 3, the stress relaxation groove 14a is formed substantially in a U-shape as seen in the axial direction, and configured to absorb thermal expansion and thermal contraction of the permanent magnet 4 (relax a stress) with the distance (groove width) between an inner surface 114a on the side in the direction of the arrow G1 and an inner surface 214a on the side in the direction of the arrow G2 varied. Specifically, when the permanent magnet 4 and the rotor core 5 are cooled (returned from a heated state to the normal temperature) during manufacture of the rotor 1, the permanent magnet 4 is expanded from a width W2a to the width W2, and the permanent magnet 4 presses the inside surface 11b of the magnet placement hole 10 in the F direction (magnetization direction). Consequently, a portion of the inside surface 11b provided on the side in the direction of the arrow G1 with respect to the inner surface 114a is not pressed in the short-length direction by the permanent magnet 4, while a portion of the inside surface 11b (a portion indicated by the dash-and-dot line in FIG. 3) provided on the side in the direction of the arrow G2 with respect to the inner surface 214a is pressed in the short-length direction by the permanent magnet 4. In this case, the distance between the inner surface 114a on the side in the direction of the arrow G1, which is adjacent to the portion of the inside surface 11b which is not pressed, and the inner surface 214a on the side in the direction of the arrow G2, which is adjacent to the portion of the inside surface 11b which is pressed, is increased, and the inside surface 11b is moved toward the hole 20, which reduces a stress generated in the rotor core 5 because of expansion of the permanent magnet 4 from the width W2a to the width W2. The stress relaxation groove 14b prescribes a width W12 (see FIG. 2) of a second magnetic flux passage 52 to be discussed later. The configuration of the stress relaxation groove 14b is otherwise similar to the configuration of the stress relaxation groove 14a, and therefore is not described.

(Configuration of Stress Relaxation Magnetic Flux Suppression Holes)

In the present embodiment, as illustrated in FIG. 2, the hole 20 has an oval shape (track shape) as seen in the axial direction. The magnetic resistance of the hole 20 is larger than the magnetic resistance of the rotor core 5. Consequently, the hole 20 has a function of suppressing passage of magnetic flux at the position at which the hole 20 is disposed. Examples of the hole 20 include a void.

In the present embodiment, the hole 20 is provided in the rotor core 5 at a portion on one side (on the side in the direction of the arrow F2) in the short-length direction of the magnet placement hole 10 with respect to the magnet placement hole 10 as seen in the axial direction, and formed so as to overlap the permanent magnet 4 in the longitudinal direction of the magnet placement hole 10 as seen in the short-length direction, to suppress magnetic flux ϕ1 (see FIG. 4) generated by the permanent magnet 4. In other words, the hole 20 has a function of restricting a magnetic flux density B1 in the rotor core 5. The hole 20 is disposed on the radially inner side with respect to the magnet placement hole 10 on one side of the magnet placement hole 10 in the short-length direction.

In the present embodiment, as illustrated in FIG. 1, a pair of holes 20 are provided on the radially inner side of each pair of magnet placement holes 10. The pair of holes 20 are each formed so as to overlap the permanent magnet 4, which is disposed in each of the pair of magnet placement holes 10, at a position P1 closer to the circumferential center line C2 of the magnetic pole 6 with respect to a center line C3 of the permanent magnet 4 in the longitudinal direction. Specifically, a pair of holes 20 include a hole 20a and a hole 20b. The hole 20a is disposed on one side (on the side in the direction of the arrow F2) of the magnet placement hole 10a in the short-length direction. The hole 20b is disposed on one side of the magnet placement hole 10b in the short-length direction. A center line C4 which passes through the center of the hole 20a in the G direction is provided on the side in the direction of the arrow G2 with respect to the center line C3 which passes through the center position of the permanent magnet 4 in the longitudinal direction.

A portion of the hole 20a on the side in the direction of the arrow G1 with respect to the center line C4 is defined as a first portion 21. A portion thereof on the side in the direction of the arrow G2 with respect to the center line C4 is defined as a second portion 22. In the present embodiment, the hole 20a is formed such that the total width (W11+W12) of a minimum width W11 of a first magnetic flux passage 51 between the first portion 21 and the magnet placement hole 10 and a minimum width W12 of a second magnetic flux passage 52 between the second portion 22 and the magnet placement hole 10 is smaller than an overlapping length L1 in the longitudinal direction between the hole 20a and the permanent magnet 4, and so as to relax a stress generated by expansion of the permanent magnet 4. The hole 20a is configured such that the total width (W11+W12) is smaller than a total length L2 of a length L21 of the first magnetic flux passage 51 in the longitudinal direction and a length L22 of the second magnetic flux passage 52 in the longitudinal direction. The length L21 of the first magnetic flux passage 51 in the longitudinal direction corresponds to the distance along the G direction between an end portion 111b of the first magnetic flux passage 51 on the side in the direction of the arrow G1 and the center line C4 which passes through the center of the hole 20a in the G direction. The length L22 of the second magnetic flux passage 52 in the longitudinal direction corresponds to the distance along the G direction between an end portion 114b of the second magnetic flux passage 52 on the side in the direction of the arrow G2 and the center line C4 which passes through the center of the hole 20a in the G direction. That is, the total length L2 corresponds to the distance along the G direction between the end portion 111b and the end portion 114b. The hole 20b is constituted similarly to the hole 20a, and therefore is not described. The first portion 21 is an example of the "portion on one side." The second portion 22 is an example of the "portion on the other side."

The minimum width W11 of the first magnetic flux passage 51 corresponds to the minimum distance between the first portion 21 and the inside surface 11b (contour line) of the magnet placement hole 10. The minimum width W12 of the second magnetic flux passage 52 corresponds to the minimum distance between the second portion 22 and the stress relaxation groove 14b. A point (point on the contour line) on the first portion 21 which forms a portion of the first magnetic flux passage 51 with the minimum width W11 on the side in the direction of the arrow G1 is defined as an end portion 21a. A point (point on the contour line) on the magnet placement hole 10 which forms a portion of the first magnetic flux passage 51 with the minimum width W11 on the side in the direction of the arrow G1 is defined as the end portion 111b. A point (point on the contour line) on the second portion 22 which forms a portion of the second magnetic flux passage 52 with the minimum width W12 on the side in the direction of the arrow G2 is defined as an end portion 22a. A point (point on the contour line) on the magnet placement hole 10 (stress relaxation groove 14b) which forms a portion of the second magnetic flux passage 52 with the minimum width W12 on the side in the direction of the arrow G2 is defined as the end portion 114b.

In other words, in the present embodiment, the hole 20 is provided at a position in the rotor core 5 at which the minimum width W12 of the second magnetic flux passage 52 is the distance between the hole 20 and the stress relaxation groove 14b. The minimum width W12 is the distance between the end portion 22a of the second portion 22 on the side of the stress relaxation groove 14b and the end portion 114b of the stress relaxation groove 14b on the side of the second portion 22. An inside surface 23a of the hole 20 in the direction of the arrow F1 and an inside surface 23b thereof in the direction of the arrow F2 are formed so as to be substantially in parallel with each other. The width between the inside surface 23a and the inside surface 23b is defined as W7. For example, the width W7 is smaller than the width W2 of the permanent magnet 4.

The first magnetic flux passage 51 means a path for the magnetic flux φ1 on the rotor core 5 that allows the magnetic flux φ1 to enter a surface 42a, on the side in the direction of the arrow F2, of a region A1 (portion) of the permanent magnet 4 that overlaps the first magnetic flux passage 51 and the second magnetic flux passage 52 as seen in the short-length direction from the side of the hole 20 in the direction of the arrow G1, or that allows the magnetic flux φ1 to exit from the surface 42a of the region A1 to the side of the hole 20 in the direction of the arrow G1. The second magnetic flux passage 52 means a path for the magnetic flux φ1 on the rotor core 5 that allows the magnetic flux φ1 to enter the surface 42a of the region A1 from the side of the hole 20 in the direction of the arrow G2, or that allows the magnetic flux φ1 to exit from the surface 42a of the region A1 to the side of the hole 20 in the direction of the arrow G2. The permanent magnet 4 has a function of generating magnetic flux also in a region A2, which is a region of the permanent magnet 4 on the side in the direction of the arrow G1 with respect to the region A1 of the permanent magnet 4, and a region A3, which is a region of the permanent magnet 4 on the side in the direction of the arrow G2 with respect to the region A1 of the permanent magnet 4. That is, in the present embodiment, the end portion 111b and the end portion 114b are provided at positions overlapping the permanent magnet 4 as seen in the short-length direction.

The hole 20 is formed such that the length L1 thereof along the longitudinal direction is equal to or less than the width W1 of the permanent magnet 4 along the longitudinal direction. Particularly, the length L1 is the distance between an end portion 21b of the hole 20 on the side in the direction of the arrow G1 and an end portion 22b of the hole 20 on the side in the direction of the arrow G2.

In the present embodiment, the end portion 21b and the end portion 22b of the hole 20 are each provided at a position overlapping the permanent magnet 4 as seen in the F direction. That is, the hole 20 is disposed such that the entire hole 20 overlaps the permanent magnet 4 as seen in the F direction. The end portion 21b and the end portion 114b are each provided at a position overlapping the permanent magnet 4 as seen in the F direction. That is, the first magnetic flux passage 51 and the second magnetic flux passage 52 are disposed such that the entirety of the first magnetic flux passage 51 and the second magnetic flux passage 52 overlaps the permanent magnet 4 as seen in the F direction.

Figure 4:
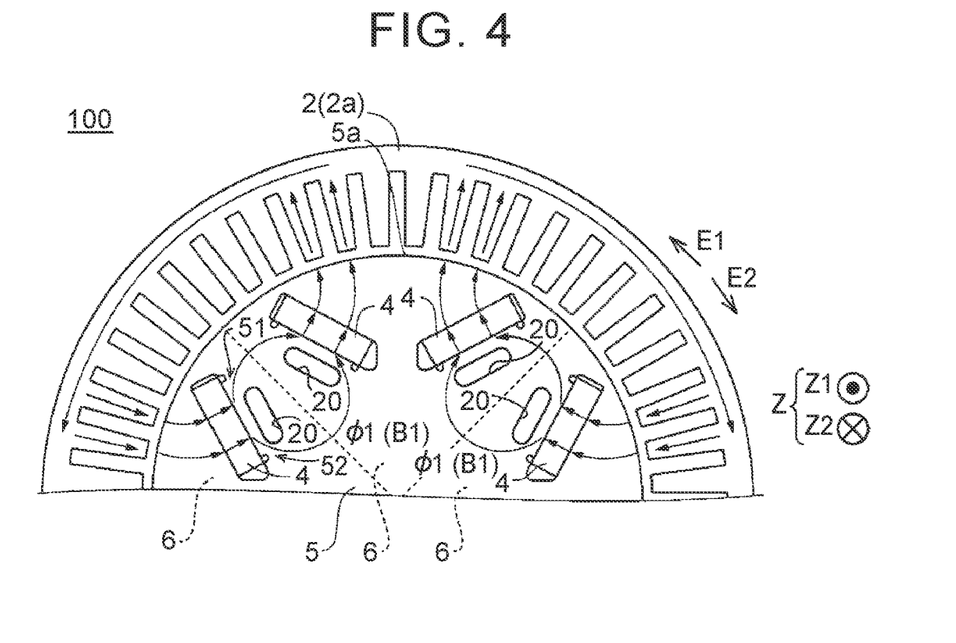
FIG. 4 illustrates magnetic saturation of the rotor according to the embodiment of the present disclosure.

In the present embodiment, as illustrated in FIG. 4, the holes 20 are configured such that magnetic saturation is caused in at least one of the first magnetic flux passage 51 and the second magnetic flux passage 52 (preferably, both of the first magnetic flux passage 51 and the second magnetic flux passage 52) since the total width (W11+W12) is smaller than the total length L2. The magnetic saturation (magnetic saturation phenomenon) means a phenomenon in which the magnetic flux density of passing magnetic flux is a saturation flux density Bm and the amount of passing magnetic flux is not proportional to the magnitude of a magnetic field. That is, the magnetic flux density B1 of the magnetic flux φ1 which passes through the first magnetic flux passage 51 and the second magnetic flux passage 52 is not more than the saturation flux density Bm. In other words, the magnetic flux density B1 is restricted to the saturation flux density Bm in the first magnetic flux passage 51 and the second magnetic flux passage 52.

Figure 5:
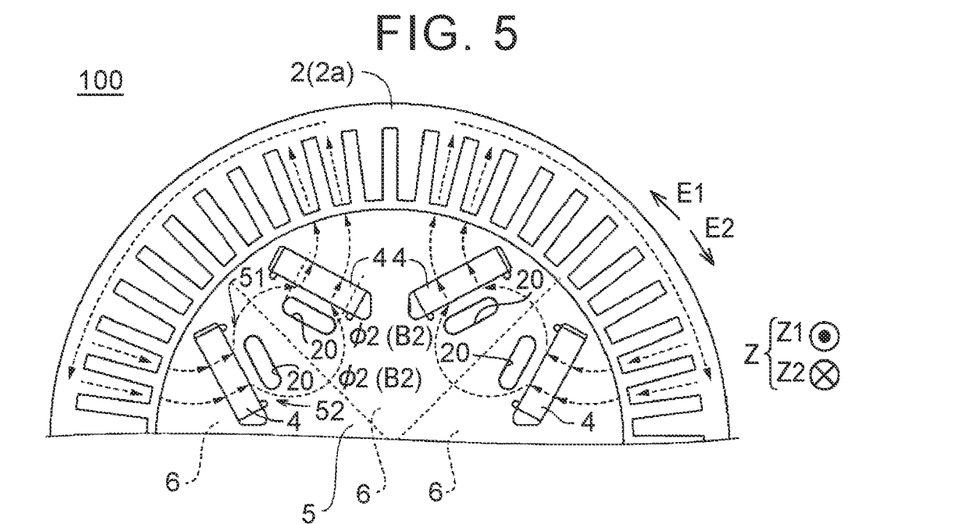
FIG. 5 illustrates magnetic flux at the time with a high load on the rotor according to the embodiment of the present disclosure.

As illustrated in FIG. 5, the holes 20 are configured such that the saturation flux density Bm in the first magnetic flux passage 51 and the second magnetic flux passage 52 is larger than a magnetic flux density B2 of magnetic flux φ2 generated by the permanent magnets 4 in a state (at the time with a high load) in which power is supplied to the coil 2b. That is, the rotor 1 is configured such that magnetic saturation is not caused in the first magnetic flux passage 51 and the second magnetic flux passage 52 at the time with a high load.

In the present embodiment, as illustrated in FIG. 3, the hole 20 is formed so as to relax a stress generated by expansion of the permanent magnet 4 from a width W2a to the width W2. Specifically, when the permanent magnet 4 is expanded from a width W2a to the width W2, a portion 53 of the rotor core 5 between the stress relaxation grooves 14a and 14b is pressed toward the hole 20 (toward the side in the direction of the arrow F2). The hole 20 is configured to reduce a stress in the portion 53 by allowing the portion 53 between the stress relaxation grooves 14a and 14b, which has been pressed, to be moved in the direction of the arrow F2 with the hole 20 narrowed (deformed) from a width W7a to the width 7.

[Generation of Magnetic Flux in Rotor]

Next, generation of magnetic flux in the rotor 1 according to the present embodiment will be described with reference to FIGS. 4 to 7 as compared with generation of magnetic flux in a rotor according to a comparative example. The rotor according to the comparative example is different from the rotor 1 according to the present embodiment in that hole portions are not formed at portions corresponding to the holes 20 of the rotor core 5.

(Case where No Power is Supplied to Coil: At Time with No Load or Low Load)

In the case where no power or relatively small power is supplied to the coil 2b (at the time with no load or a low load), as illustrated in FIG. 4, the magnetic flux φ1 is generated from the permanent magnets 4 for one magnetic pole 6 in the rotor 1 according to the present embodiment. The magnetic flux φ1 passes through a portion of the rotor core 5 on the radially outer side (on the side in the direction of the arrow F1) with respect to the permanent magnets 4, and enters portions of the rotor core 5 for different magnetic poles 6 from the radially outer side by way of a void between an outer peripheral surface 5a of the rotor 1 and the stator core 2a and the teeth and the back yoke of the stator core 2a. At this time, the magnetic flux φ1 is larger than the magnetic flux ϕ2 at the time with a high load since no power or relatively small power is supplied to the coil 2b of the stator 2. The magnetic flux ϕ1 enters the permanent magnets 4 for the different magnetic poles 6 from the radially outer side, and exits from the permanent magnets 4 from the radially inner side. The holes 20 are provided on the radially inner side of the permanent magnets 4, and the magnetic flux ϕ1 passes through the first magnetic flux passage 51 and the second magnetic flux passage 52. At this time, the magnetic flux density B1 in the first magnetic flux passage 51 and the second magnetic flux passage 52 is the saturation flux density Bm. The magnetic flux ϕ1 returns to the permanent magnets 4 for the one magnetic pole 6.

Figure 6:
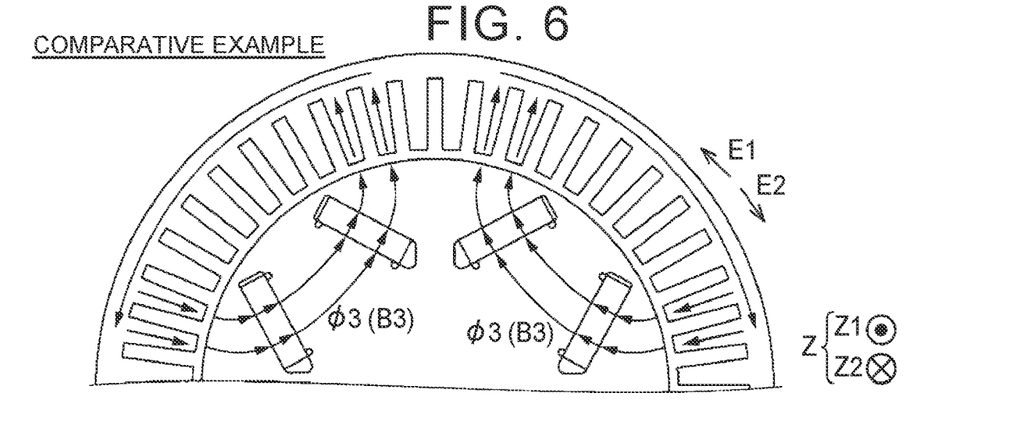
FIG. 6 illustrates magnetic flux at the time with no load or a low load on a rotor according to a comparative example.
Figure 7:
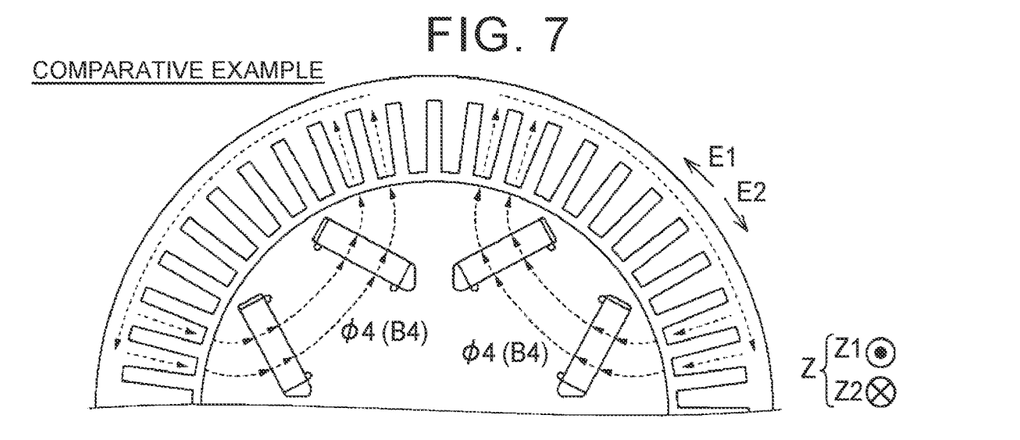
FIG. 7 illustrates magnetic flux at the time with a high load on the rotor according to the comparative example.

In the rotor according to the comparative example at the time with no load or a low load, as illustrated in FIG. 6, magnetic flux ϕ3 which exits from permanent magnets for one magnetic pole passes through a portion of a rotor core on the radially outer side (on the side in the direction of the arrow F1) with respect to the permanent magnets, and enters portions of the rotor core for different magnetic poles from the radially outer side by way of the teeth and the back yoke of a stator core. At this time, the magnetic flux ϕ3 is larger than magnetic flux ϕ4 at the time with a high load since no power or relatively small power is supplied to a coil of a stator. The magnetic flux ϕ3 enters the permanent magnets for the different magnetic poles from the radially outer side, and exits from the permanent magnets from the radially inner side. The magnetic flux ϕ3 which exits from the permanent magnets for the different magnetic poles returns to the permanent magnets for the one magnetic pole by way of a magnetic path in the rotor core. At this time, magnetic saturation is not caused in the magnetic path in the rotor core, and the magnetic flux ϕ3 in the comparative example is larger than the magnetic flux ϕ1 in the present embodiment. Thus, the iron loss is reduced with the rotor 1 according to the present embodiment compared to the rotor according to the comparative example.

(Case where Power is Supplied to Coil: At Time with High Load)

In the case where power is supplied to the coil 2b, as illustrated in FIG. 5, the magnetic flux ϕ2 in the rotor 1 according to the present embodiment is smaller than the magnetic flux ϕ1 because of a magnetic field H generated by the coil 2b, unlike the case where no power is supplied to the coil 2b. Magnetic saturation is not caused in the first magnetic flux passage 51 and the second magnetic flux passage 52 since the magnetic flux ϕ2 is smaller than the saturation flux density Bm.

In the rotor according to the comparative example, in the case where power is supplied to the coil 2b, the magnetic flux ϕ4 (magnetic flux density B4) is smaller than the magnetic flux ϕ3 (magnetic flux density B3) because of a magnetic field generated by the coil 2b. Magnetic saturation is not caused with any of the rotor 1 according to the present embodiment and the rotor according to the comparative example, and therefore the magnetic flux ϕ2 (magnetic flux density B2) and the magnetic flux ϕ4 (magnetic flux density B4) are substantially equal to each other. That is, the rotor 1 according to the present embodiment is not substantially affected by the function of the holes 20 to suppress magnetic flux in the case where power is supplied to the coil (at the time with a high load).

Effects of Embodiment

The following effects can be obtained with the embodiment described above.

In the embodiment described above, the stress relaxation magnetic flux suppression hole (20), which is provided on one side of the magnet placement hole (10) in the short-length direction, relaxes a stress generated by expansion of the permanent magnet (4), and suppresses magnetic flux generated by the permanent magnet (4), is formed such that the total width (W11+W12) of the minimum width (W11) of the first magnetic flux passage (51) and the minimum width (W12) of the second magnetic flux passage (52) is less than the total length (L2) of the length (L21) of the first magnetic flux passage (51) in the longitudinal direction and the length (L22) of the second magnetic flux passage (52) in the longitudinal direction. Consequently, a stress generated by expansion of the permanent magnet (4) can be relaxed, even in the case where the permanent magnet (4) is expanded with respect to the rotor core (5), during manufacture of the rotor (1). The widths (W11 and W12) of the first magnetic flux passage (51) and the second magnetic flux passage (52), through which magnetic flux (ϕ1, ϕ2) that enters or exits from the surface (42a) of the permanent magnet (4) corresponding to the total length (L2), can be restricted by the stress relaxation magnetic flux suppression hole (20) while relaxing a stress generated by expansion of the permanent magnet (4) with the stress relaxation magnetic flux suppression hole (20). Magnetic saturation is caused in the first magnetic flux passage (51) and the second magnetic flux passage (52), the widths (W11 and W12) of which are restricted as described above, in the case where much magnetic flux passes therethrough. Thus, the amount of magnetic flux that passes through the first magnetic flux passage and the second magnetic flux passage can be restricted, which suppress magnetic flux that passes therethrough from becoming excessive. As a result, it is possible to suppress magnetic flux from the permanent magnet (4) from becoming excessive, even in a state in which no power or relatively small power is supplied to the coil (2b) of the stator (2), while relaxing a stress generated by expansion of the permanent magnet (4).

In the case where power is supplied to the coil (2b) of the stator (2) (at the time with a high load), the amount of magnetic flux generated by the permanent magnet (4) is decreased (the magnet operation point is lowered) by a magnetic field generated by the coil (2b) of the stator (2). Thus, magnetic saturation is unlikely to be caused in the first magnetic flux passage (51) and the second magnetic flux passage (52) even in the case where the widths of the first magnetic flux passage (51) and the second magnetic flux passage (52) are restricted by the stress relaxation magnetic flux suppression hole (20). Thus, it is possible to suppress the performance of the rotor (1) from being degraded. As a result, it is possible to suppress magnetic flux from the permanent magnet (4) from becoming excessive in the case where no power or relatively small power is supplied to the coil (2b) of the stator (2) (at the time with no load or a low load), while suppressing the performance of the rotor (1) from being degraded in the case where power is supplied to the coil (2b) of the stator (2) (at the time with a high load).

In the embodiment described above, the stress relaxation magnetic flux suppression hole (20) is formed so as to relax a stress generated by expansion of the permanent magnet (4). Consequently, a stress due to expansion of the permanent magnet (4) can be relaxed by the stress relaxation magnetic flux suppression hole (20), even in the case where the permanent magnet (4) is expanded with respect to the rotor core (5), during manufacture of the rotor (1). As a result, it is possible to suppress magnetic flux from the permanent magnet (4) from becoming excessive, even in a state in which no power or relatively small power is supplied to the coil (2b) of the stator (2), while relaxing a stress due to expansion of the permanent magnet (4). By suppressing magnetic flux from the permanent magnet (4) from becoming excessive, it is possible to suppress an increase in the iron loss in the rotor (1) or the stator (2) due to magnetic flux becoming excessive, and to suppress a reduction in the energy efficiency with which the rotor (1) is rotated.

In the embodiment described above, the rotor core (5) is disposed so as to face the stator (2) which has the coil (2b) in the radial direction; and the stress relaxation magnetic flux suppression hole (20) is configured to cause magnetic saturation in at least one of the first magnetic flux passage (51) and the second magnetic flux passage (52) since the total width (W11+W12) is less than the total length (L2). With such a configuration, it is possible to more reliably suppress magnetic flux from the permanent magnet (4) from becoming excessive, in a state in which no power or relatively small power is supplied to the coil (2b) of the stator (2), since magnetic saturation is caused in at least one of the first magnetic flux passage (51) and the second magnetic flux passage (52).

In the embodiment described above, the rotor core (5) is disposed on the radially inner side with respect to the stator (2); and the stress relaxation magnetic flux suppression hole (20) is disposed on the radially inner side, which is one side of the magnet placement hole (10) in the short-length direction, with respect to the magnet placement hole (10). A magnetic flux passage on the other side of the magnet placement hole in the short-length direction (on the side of the stator and on the radially outer side) is used as a passage through which magnetic flux passes when power is supplied to the coil of the stator (at the time with a high load). Therefore, it is considered that, in the case where the stress relaxation magnetic flux suppression hole is provided on the other side of the magnet placement hole in the short-length direction, the amount of magnetic flux is occasionally restricted even when power is supplied to the coil of the stator, which lowers the energy efficiency of the rotary electric machine. In the case where the stress relaxation magnetic flux suppression hole (20) is disposed on the radially inner side of the magnet placement hole (10) (on the side opposite to the stator (2)) with respect to the magnet placement hole (10) as in the embodiment described above, in contrast, it is possible to suppress a reduction in the energy efficiency of the rotary electric machine (100) by suppressing the amount of magnetic flux from being restricted in the case where power is supplied to the coil (2b) of the stator (2), while suppressing magnetic flux from the permanent magnet (4) from becoming excessive in the case where no power is supplied to the coil (2b) of the stator (2).

In the embodiment described above, the length (L1) of the stress relaxation magnetic flux suppression hole (20) along the longitudinal direction is equal to or less than the length (W1) of the permanent magnet (4) along the longitudinal direction. With such a configuration, the stress relaxation magnetic flux suppression hole (20) is not increased in size more than necessary, and accordingly a reduction in the mechanical strength of the rotor core (5) can be suppressed even in the case where the stress relaxation magnetic flux suppression hole (20) is provided.

In the embodiment described above, the end portion (111b) of the magnet placement hole (10) on one side in the longitudinal direction which forms a portion of the first magnetic flux passage (51) with the minimum width (W11) of the first magnetic flux passage (51) and the end portion (114b) of the magnet placement hole (10, 14) on the other side in the longitudinal direction which forms a portion of the second magnetic flux passage (52) with the minimum width (W12) of the second magnetic flux passage (52) are provided at positions overlapping the permanent magnet (4) as seen in the short-length direction. The permanent magnet is expanded in the short-length direction. Thus, it is considered that, in the case where a part of a portion of the stress relaxation magnetic flux suppression hole at which the first magnetic flux passage and the second magnetic flux passage have the minimum width is disposed at a position not overlapping the permanent magnet, the function of relaxing a stress due to expansion of the permanent magnet is impaired at the part of the portion at which the first magnetic flux passage and the second magnetic flux passage have the minimum width and which is disposed at a position not overlapping the permanent magnet. With the configuration according to the embodiment described above, in contrast, the entirety of a portion of the stress relaxation magnetic flux suppression hole (20) at which the first magnetic flux passage (51) and the second magnetic flux passage (52) have the minimum widths (W11, W12) is disposed at a position overlapping the permanent magnet (4) as seen in the short-length direction. Thus, it is possible to effectively suppress magnetic flux from the permanent magnet (4) from becoming excessive while suppressing the function of relaxing a stress from being impaired, unlike the case where a part of a portion of the stress relaxation magnetic flux suppression hole at which the first magnetic flux passage (51) and the second magnetic flux passage (52) have the minimum widths (W11, W12) is disposed at a position not overlapping the permanent magnet.

In the embodiment described above, the magnet placement hole (10) is provided with the stress relaxation groove (14a, 14b) which is provided on the side of the stress relaxation magnetic flux suppression hole (20) and formed so as to be dented toward one side in the short-length direction from a position adjacent, in the short-length direction, to the end portion (43, 44) of the permanent magnet (4) in the longitudinal direction, the stress relaxation groove (14a, 14b) relaxing a stress generated by expansion of the permanent magnet (4). With such a configuration, the stress relaxation groove (14, 14b) can be suppressed from being increased in size by providing the stress relaxation magnetic flux suppression hole (20), which has a function of relaxing a stress, even in the case where the magnet placement hole (10) is provided with the stress relaxation groove (14a, 14b). That is, a stress due to expansion of the permanent magnet (4) can be effectively relaxed by the stress relaxation groove (14a, 14b) and the stress relaxation magnetic flux suppression hole (20) which has a function of relaxing a stress.

In the embodiment described above, the stress relaxation magnetic flux suppression hole (20) is provided at a position in the rotor core (5) at which at least one of the minimum width (W11) of the first magnetic flux passage (51) and the minimum width (W12) of the second magnetic flux passage (52) is the distance (W12) between the stress relaxation magnetic flux suppression hole (20) and the stress relaxation groove (14a, 14b). With such a configuration, the stress relaxation groove (14a, 14b) can have both a function of relaxing a stress due to expansion of the permanent magnet (4) and a function of restricting the amount of magnetic flux in the first magnetic flux passage (51) or the second magnetic flux passage (52).

In the embodiment described above, the rotor core (5) is disposed on the radially inner side with respect to the stator (2); the rotor core (5) is provided with a pair of magnet placement holes (10) for each magnetic pole (6), the magnet placement holes (10) having a V-shape in which the magnet placement holes (10) are farther away from each other on the radially outer side as seen in the axial direction; a pair of stress relaxation magnetic flux suppression holes (20) are respectively provided on the radially inner side of the pair of magnet placement holes (10); and the pair of stress relaxation magnetic flux suppression holes (20) are respectively formed at positions closer to the circumferential center (C2) of the magnetic pole (6) than the center positions (C3), in the longitudinal direction, of the permanent magnets (4) which are respectively disposed in the pair of magnet placement holes (10) so as to overlap the permanent magnets (4) in the longitudinal direction. A relatively large load acts on a portion of the rotor core (5) on the radially outer side (on the side of the stator (2)). Therefore, the stress relaxation magnetic flux suppression hole (20) is preferably provided on the radially inner side (on the side opposite to the stator (2)) of the rotor core (5). It is considered that, in the case where the stress relaxation magnetic flux suppression hole is provided on outer side, in the circumferential direction, of the magnetic pole which is provided with a pair of magnet placement holes that have a V-shape, stress relaxation magnetic flux suppression holes for magnetic poles that are adjacent to each other in the circumferential direction are proximate to each other in the circumferential direction on the radially outer side. Therefore, it is considered that a portion of the rotor core between the stress relaxation magnetic flux suppression holes in the circumferential direction has a relatively small width, which lowers the mechanical strength of the rotor core. In consideration of such points, if the pair of stress relaxation magnetic flux suppression holes (20) are respectively disposed at the positions (P1) closer to the circumferential center (C2) of the magnetic pole (6) than the center positions (C3), in the longitudinal direction, of the permanent magnets (4) which are respectively disposed in the pair of magnet placement holes (10) as in the embodiment described above, stress relaxation magnetic flux suppression holes (20) which are disposed for magnetic poles (6) which are adjacent to each other in the circumferential direction can be suppressed from being proximate to each other in the circumferential direction in a portion of the rotor core (5) on the radially outer side, unlike the case where a pair of stress relaxation magnetic flux suppression holes are disposed at positions on the outer side, in the circumferential direction, of the magnetic pole and closer to the radially outer side. As a result, magnetic flux from the permanent magnets (4) can be suppressed from becoming excessive while suppressing a reduction in the mechanical strength of the rotor core (5).

In the embodiment described above, the stress relaxation magnetic flux suppression hole (20) has an oval shape as seen in the axial direction. With such a configuration, the mechanical strength of the rotor core (5) can be improved since an oval shape does not have a corner portion at which stress concentration relatively tends to occur.

[Modifications]

The embodiment disclosed herein should be considered as exemplary and non-limiting in all respects. disclosure (First Modification)

Figure 8:
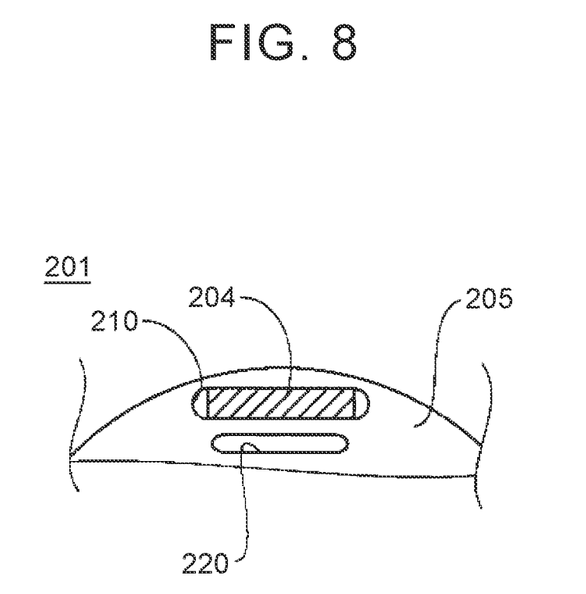
FIG. 8 illustrates the configuration of a rotor according to a first modification of the embodiment of the present disclosure.

For example, in the embodiment described above, a pair of V-shaped magnet placement holes and a pair of stress relaxation magnetic flux suppression holes are provided for each of the magnetic poles. However, the present disclosure is not limited thereto. For example, one magnet placement hole 210 and one stress relaxation magnetic flux suppression hole 220 may be provided for each of magnetic poles as in a rotor 201 according to a first modification illustrated in FIG. 8. Specifically, a permanent magnet 204 is disposed in the magnet placement hole 210 such that the short-length direction of the permanent magnet 204 is parallel to the radial direction in a rotor core 205 of the rotor 201. The rotor core 205 is provided with the stress relaxation magnetic flux suppression hole 220 which is formed on the radially inner side of the magnet placement hole 210 so as to overlap the permanent magnet 204 in the longitudinal direction of the magnet placement hole 210 as seen in the short-length direction.

(Second Modification)

Figure 9:
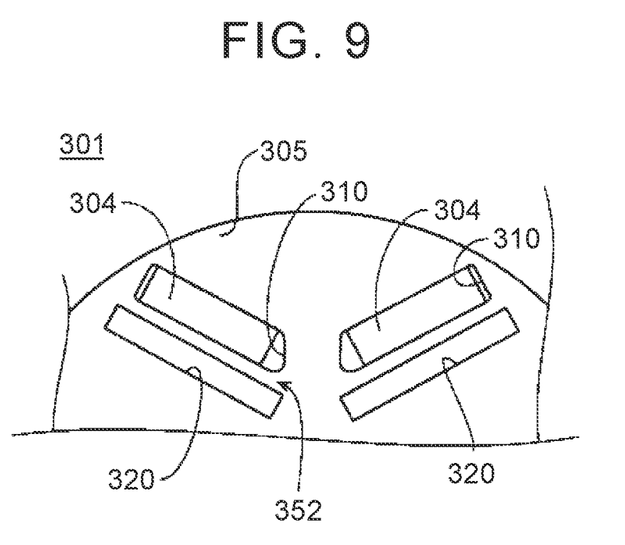
FIG. 9 illustrates the configuration of a rotor according to a second modification of the embodiment of the present disclosure.

In the embodiment described above, the rotor core is formed such that the entire stress relaxation magnetic flux suppression hole overlaps the permanent magnet in the longitudinal direction of the magnet placement hole. However, the present disclosure is not limited thereto. For example, a rotor core 305 may be formed such that a part of a stress relaxation magnetic flux suppression hole 320 overlaps a permanent magnet 304 as in a rotor 301 according to a second modification illustrated in FIG. 9.

In the embodiment described above, the length of the stress relaxation magnetic flux suppression hole along the longitudinal direction is equal to or less than the length of the permanent magnet along the longitudinal direction. However, the present disclosure is not limited thereto. That is, the rotor core 305 may be configured such that the length of the stress relaxation magnetic flux suppression hole 320 along the longitudinal direction is larger than the length of the permanent magnet 304 along the longitudinal direction as in the rotor 301 according to the second modification illustrated in FIG. 9.

In the embodiment described above, both end portions of the stress relaxation magnetic flux suppression hole in the longitudinal direction are provided at positions overlapping the permanent magnet as seen in the short-length direction. However, the present disclosure is not limited thereto. That is, both end portions of the stress relaxation magnetic flux suppression hole in the longitudinal direction may be disposed at positions not overlapping the permanent magnet (at positions on the outer sides in the longitudinal direction) as seen in the short-length direction as in the rotor 301 according to the second modification illustrated in FIG. 9.

In the embodiment described above, the magnet placement hole is provided with the stress relaxation grooves. However, the present disclosure is not limited thereto. That is, the magnet placement hole 310 may not be provided with stress relaxation grooves, as in the rotor 301 according to the second modification illustrated in FIG. 9, in the case where a stress can be sufficiently relaxed by the stress relaxation magnetic flux suppression hole 320.

In the embodiment described above, the stress relaxation magnetic flux suppression hole is formed such that the minimum width of the second magnetic flux passage is the distance between the stress relaxation magnetic flux suppression hole and the stress relaxation groove. However, the present disclosure is not limited thereto. For example, the stress relaxation magnetic flux suppression hole 320 may be formed such that the minimum width of a second magnetic flux passage 352 is the distance between the stress relaxation magnetic flux suppression hole 320 and the inside surface of the magnet placement hole 310 which is different from a stress relaxation groove as in the rotor 301 according to the second modification illustrated in FIG. 9.

In the embodiment described above, the stress relaxation magnetic flux suppression hole is formed so as to have an oval shape as seen in the magnetic saturation. However, the present disclosure is not limited thereto. For example, the stress relaxation magnetic flux suppression hole 320 may be formed so as to have a rectangular shape as in the rotor 301 according to the second modification illustrated in FIG. 9.

(Other Modifications)

In the embodiment described above, the rotary electric machine is constituted as a rotary electric machine of an inner rotor type. However, the present disclosure is not limited thereto. For example, the rotary electric machine may be constituted as a rotary electric machine of an outer rotor type.

In the embodiment described above, the permanent magnets are configured to be expanded in the short-length direction by being cooled. However, the present disclosure is not limited thereto. For example, the permanent magnets may be configured to be expanded in the short-length direction by being heated if the coefficient of thermal expansion of the permanent magnets is different from the coefficient of thermal expansion of the rotor core.

In the embodiment described above, the rotor core and the stator core are constituted by stacking silicon steel sheets. However, the present disclosure is not limited thereto. For example, the rotor core and the stator core may be constituted by pressure-forming magnetic powder etc.

In the embodiment described above, magnetic saturation is caused in both the first magnetic flux passage and the second magnetic flux passage in the no-load state or low-load state. However, the present disclosure is not limited thereto. That is, magnetic saturation may be caused in only one of the first magnetic flux passage and the second magnetic flux passage in the no-load state or low-load state.

What is claimed is:

1. A rotor comprising: a permanent magnet; and a rotor core that has a magnet placement hole in which the permanent magnet is disposed, wherein: the rotor core is provided with a stress relaxation magnetic flux suppression hole provided on one side of the magnet placement hole in a short-length direction of the magnet placement hole with respect to the magnet placement hole as seen in an axial direction and formed so as to overlap the permanent magnet in a longitudinal direction of the magnet placement hole as seen in the short-length direction, the stress relaxation magnetic flux suppression hole relaxing a stress generated by expansion of the permanent magnet and suppressing magnetic flux generated by the permanent magnet; the stress relaxation magnetic flux suppression hole is formed such that a total width of a minimum width of a first magnetic flux passage between a portion of the stress relaxation magnetic flux suppression hole on a first side in the longitudinal direction and the magnet placement hole and a minimum width of a second magnetic flux passage between a portion of the stress relaxation magnetic flux suppression hole on a second side in the longitudinal direction and the magnet placement hole is less than a total length of a length of the first magnetic flux passage in the longitudinal direction and a length o the second magnetic; flux passage in the longitudinal direction; the rotor core is disposed on a radially inner side with respect to a stator; the stress relaxation magnetic flux suppression hole is disposed on another radially inner side with respect to the magnet placement hole, which is one side of the magnet placement hole in the short-length direction; and a length of the stress relaxation magnetic flux suppression hole along the longitudinal direction is equal to or less than a length of the permanent magnet along the longitudinal direction.

2. The rotor according to claim 1, wherein:
the rotor core is disposed so as to face the stator that has a coil in a radial direction; and
the stress relaxation magnetic flux suppression hole is configured to cause magnetic saturation in at least one of the first magnetic flux passage and the second magnetic flux passage since the total width is less than the total length.

3. The rotor according to claim 1, wherein:
the rotor core is disposed on a radially inner side with respect to the stator;
the rotor core is provided with a pair of the magnet placement holes for each magnetic pole, the magnet placement holes having a V-shape in which the magnet placement holes are farther away from each other on a radially outer side as seen in the axial direction;
a pair of the stress relaxation magnetic flux suppression holes are respectively provided on a radially inner side of the pair of magnet placement holes; and
the pair of stress relaxation magnetic flux suppression holes are respectively formed at positions closer to a circumferential center of the magnetic pole than center positions, in the longitudinal direction, of the permanent magnets which are respectively disposed in the pair of magnet placement holes so as to overlap the permanent magnets in the longitudinal direction.

4. The rotor according to claim 1, wherein
the stress relaxation magnetic flux suppression hole has an oval shape as seen in the axial direction.

5. The rotor according to claim 1, wherein
the magnet placement hole is provided with a stress relaxation groove provided on a stress relaxation magnetic flux suppression hole side and formed so as to be dented toward one side in the short-length direction from a position adjacent, in the short-length direction, to an end of the permanent magnet in the longitudinal direction, the stress relaxation groove relaxing a stress generated by expansion of the permanent magnet.

6. The rotor according to claim 5, wherein
the stress relaxation magnetic flux suppression hole is provided at a position in the rotor core at which at least one of the minimum width of the first magnetic flux passage and the minimum width of the second magnetic flux passage is a distance between the stress relaxation magnetic flux suppression hole and the stress relaxation groove.

7. The rotor according to claim 1, wherein
a first end of the magnet placement hole on a first side in the longitudinal direction that forms a portion of the first magnetic flux passage with the minimum width of the first magnetic flux passage and a second end of the magnet placement hole on a second side in the longitudinal direction that forms a portion of the second magnetic flux passage with the minimum width of the second magnetic flux passage are provided at positions overlapping the permanent magnet as seen in the short-length direction.

8. The rotor according to claim 7, wherein
the magnet placement hole is provided with a stress relaxation groove provided on a stress relaxation magnetic flux suppression hole side and formed so as to be dented toward one side in the short-length direction from a position adjacent, in the short-length direction, to an end of the permanent magnet in the longitudinal direction, the stress relaxation groove relaxing a stress generated by expansion of the permanent magnet.

9. The rotor according to claim 8, wherein
the stress relaxation magnetic flux suppression hole is provided at a position in the rotor core at which at least one of the minimum width of the first magnetic flux passage and the minimum width of the second magnetic flux passage is a distance between the stress relaxation magnetic flux suppression hole and the stress relaxation groove.

10. A rotary electric machine comprising: a stator; and a rotor disposed so as to face the stator in a radial direction, wherein: the rotor has a permanent magnet and a rotor core that has a magnet placement hole in which the permanent magnet is disposed; the rotor core is provided with a stress relaxation magnetic flux suppression hole provided on one side of the magnet placement hole in a short-length direction of the magnet placement hole with respect to the magnet placement hole as seen in an axial direction and formed so as to overlap the permanent magnet in a longitudinal direction of the magnet placement hole as seen in the short-length direction, the stress relaxation magnetic flux suppression hole relaxing a stress generated by expansion of the permanent magnet and suppressing magnetic flux generated by the permanent magnet; the stress relaxation magnetic flux suppression hole is formed such that a total width of a minimum width of a first magnetic flux passage between a portion of the stress relaxation magnetic flux suppression hole on a first side in the longitudinal direction and the magnet placement hole and a minimum width of a second magnetic flux passage between a portion of the stress relaxation magnetic flux suppression hole on a second side in the longitudinal direction and the magnet placement hole is less than a total length of a length of the first magnetic flux passage in the longitudinal direction and a length of the second magnetic flux passage in the longitudinal direction; and the rotor core is disposed on a radially inner side with respect to the stator; the stress relaxation magnetic flux suppression hole is disposed on another radially inner side with respect to the magnet placement hole, which is one side of the magnet placement hole in the short-length direction; and a length of the stress relaxation magnetic flux suppressor hole along the longitudinal direction is equal to or less than a length of the permanent magnet along the longitudinal direction.

* * * * *